Aug. 16, 1955     M. ACRI     2,715,340
ROLLER TRANSMISSION CHAINS
Filed April 24, 1951
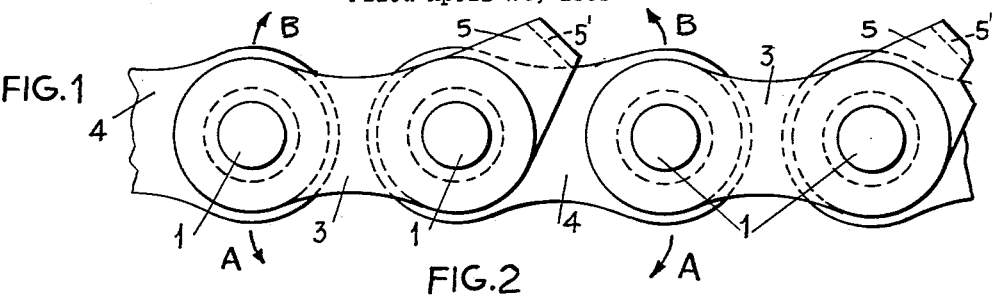
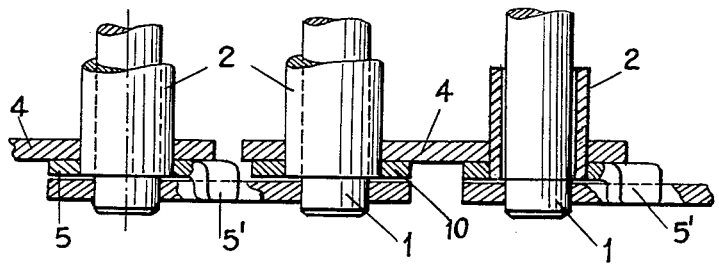
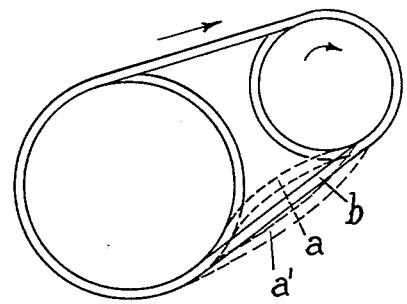
Inventor
Mario Acri
By Robert E. Burns
Attorney

United States Patent Office 2,715,340
Patented Aug. 16, 1955

2,715,340

ROLLER TRANSMISSION CHAINS

Mario Acri, Asti, Italy, assignor to Fabbriche Riunite Way-Assauto, Asti, Italy

Application April 24, 1951, Serial No. 222,718

Claims priority, application Italy April 29, 1950

6 Claims. (Cl. 74—245)

It is known that roller transmission chains, more particularly when their cooperating toothed wheels have their axles very close to one another and are not capable of adjustment, suffer from the drawback that the chains become noisy and inefficient long before the chain pitch has undergone the full amount of permissible elongation, which results in a considerable waste of chains. A further inconvenience of the chains for use on stationary axles, resides in the fact that it is extremely difficult to obtain chains of strictly accurate length, on account of the large number of tolerances involved, resulting in a chain longer or shorter than expected, which gives rise to various difficulties in assembly and adaptation, since, for instance, an excessive length of a new chain is again a cause of shortened life of the chain.

It is an object of this invention to overcome the foregoing disadvantages and difficulties by providing a chain with means for limiting the angle between two adjacent associated links, the spacing of said means on the chain being a multiple of the chain pitch.

According to the invention, there is provided a roller transmission chain, wherein stop levers are mounted with a pressed fit on equally spaced pivot pins or bushings on the chain, said stop levers being formed with bent ends abutting the flanks of the associated links, thereby limiting in a predetermined direction the angle between two adjacent associated links.

The invention will be described with reference to the accompanying drawings which show by way of example two embodiments thereof.

Fig. 1 is a side elevation of a section of a roller transmission chain in accordance with the invention.

Fig. 2 is a partial axial section.

Fig. 3 is a partial axial section, similar to Fig. 2, of a modification in which the stop levers are arranged with a tight fit on the bushings instead of on the pivots.

Fig. 4 shows diagrammatically a chain transmission.

Referring to Figs. 1 and 2 of the drawings, the chain comprises pivot pins 1 having sleeves or bushings 2 rotatably mounted thereon, the bushings being shorter than the pins so that the ends of the pins project beyond the ends of the bushings. Successive pairs of pins 1 are connected by pairs of links 3 and successive pairs of bushings 2 are connected by pairs of links 4 in like manner. As shown in Figs. 1 and 2, the links that connect the pins alternate with the links that connect bushings. Thus, referring to Fig. 1, the first and second pin (starting from the left) are connected by links 3, as are also the third and fourth pins. The second bushing and third bushing are connected by links 4, as are also the fourth bushing and the next bushing (not shown). Thus, the first two pins 1 (starting from the left of Fig. 1), together with their connecting links 3, constitute one unit or link of the chain while the second and third bushings 2, together with their connecting links, constitute the next link or unit of the chain, etc. In accordance with usual practice, the links 3 are fixed with respect to the pivot pins 1 so that the two pivot pins of a pair and their connecting links form a substantially rigid unit. In like manner, the links 4 are fixed to the bushings 2 that they connect. Articulation of the chain is provided by the relative rotation of the bushings 2 and the pivot pins 1 that extend through them.

In accordance with the invention, as illustrated in Figs. 1 and 2, levers 5 are tightly fitted on pivot pins 1, being preferably disposed between the links 3 and 4 (Fig. 2). Each of the levers 5 has a bent end portion 5' that is adapted to abut the flank of the associated link 4 when, on the driven side of the transmission, two successive links of the chain reach their desired angular position. Thus, as viewed in Fig. 1, the levers 5 prevent the adjacent links of the chain from pivoting relative to one another in the direction indicated by the arrows B. Referring to Fig. 4, the driven portion of the chain is thereby caused to travel in a path $b$ instead of swinging back and forth between positions $a$ and $a'$. It will be seen that the levers 5 permit the chain to bend in the direction indicated by arrows A in Fig. 1 so that the chain can pass over the sprockets on which it is used.

The embodiment shown in Fig. 3 is essentially the same as that of Figs. 1 and 2, corresponding parts being designated by the same reference numerals, the only differences being that the levers 5 are tightly fitted on end portions of bushings 2 instead of on the pivot pins 1. The end portions 5' of the levers 5 are bent outwardly so as to engage adjacent links 3.

Instead of having the levers 5 on successive pins or bushings, it is preferable to have them spaced, the spacing of the levers 5 thus being a multiple of the chain pitch. A spacing washer 10 is fitted onto each of the pivot pins or bushings not provided with a stop lever 5 so as to preserve the proper spacing between the chain elements. Instead of employing only one lever on a pivot pin or bushing, a plurality of stop levers may be provided, for example one at each end of the pin or bushing.

In the initial assembly of the chain, the bent ends 5' of the levers 5 are preferably spaced slightly from the edges of the adjacent links. After the chain has been stretched and measured, an adjustment is effected by slight angular displacement of the levers in order to bring the bent ends 5' of the levers into engagement with the adjacent links when the chain is in its proper position. Undesirable whipping of the chain during operation is thereby avoided.

It will be understood that the embodiments illustrated in the drawings and particularly described above are merely by way of example and that further modifications may be made within the scope of the appended claims.

What I claim is:

1. In a roller transmission chain the combination, with a plurality of pivoting members and links connecting said pivoting members, of stop levers disposed at intervals on the chain equal to multiples higher than one chain pitch, said stop levers being mounted on said pivoting members with a tight fit and adapted to engage the adjacent links to limit in one direction the value of the angle between two adjacent links of the chain.

2. In a roller transmission chain the combination, with a plurality of pivot pins, sleeves rotatably mounted on said pins and links alternately connecting said pins and said sleeves, of stop levers arranged with a tight fit at intervals on said pins and cooperating with said links for limiting in one direction the value of the angle between two adjacent links.

3. In a roller transmission chain the combination, with a plurality of pivot pins, sleeves rotatably mounted on said pins and links alternately connecting said pins and said sleeves, of stop levers arranged with a tight fit at intervals equal to multiples higher than one chain pitch on said sleeves and cooperating with said links for limiting in one direction the value of the angle between two adjacent links.

4. In a roller transmission chain the combination, with a plurality of pivot pins, sleeves rotatably mounted on said pins and links connecting alternately said pins and said sleeves, of stop levers arranged with a tight fit at intervals equal to multiples higher than one chain pitch on selected ones of said pins and having bent ends adapted to engage adjacent links for limiting in one direction the value of the angle between two adjacent links.

5. In a roller transmission chain the combination, with a plurality of pivot pins, sleeves rotatably mounted on said pins and links connecting alternately said pins and sleeves, of stop levers arranged with a tight fit at intervals equal to multiples higher than one chain pitch on selected ones of said sleeves and having bent ends adapted to engage adjacent links for limiting in one direction the angle between two adjacent links.

6. In a roller transmission chain adapted to run over driving and driven sprockets and comprising an endless series of links each having pivot members at opposite ends, the pivot members of successive links comprising coaxial shaft elements disposed one inside the other and rotatable relative to one another to provide pivotal joints between successive links, stop levers fixed on one pivot shaft of each of recurring spaced links only and having portions engaging the next adjacent links to block their angular movement in one direction beyond a straight in line position while permitting free angular movement in the opposite direction, intervening joints being free to flex in both directions to permit reverse bending of the chain, the engagement of said levers with said adjacent links as the chain comes off a driving sprocket and straightens out exerting pressures tending to produce a predetermined reverse curvature in said chain to take up slack and produce quiet running of the chain.

References Cited in the file of this patent

UNITED STATES PATENTS

| | | |
|---|---|---|
| 601,748 | Dundas | Apr. 5, 1898 |
| 745,361 | Levalley | Dec. 1, 1903 |